W. T. HILDRUP.
Revolving Harrow.

No. 22,805.

Patented Feb. 1, 1859.

UNITED STATES PATENT OFFICE.

W. T. HILDRUP, OF HARRISBURG, PENNSYLVANIA.

IMPROVEMENT IN ROTARY HARROWS.

Specification forming part of Letters Patent No. 22,805, dated February 1, 1859.

*To all whom it may concern:*

Be it known that I, W. T. HILDRUP, of Harrisburg, in the county of Dauphin and State of Pennsylvania, have invented a new and useful Improvement in Rotary Harrows; and I do hereby declare that the following is a full, clear, and exact description of the same, reference being had to the annexed drawings, forming part of this specification, in the several figures of which similar characters of reference denote the same part.

Figure 1:
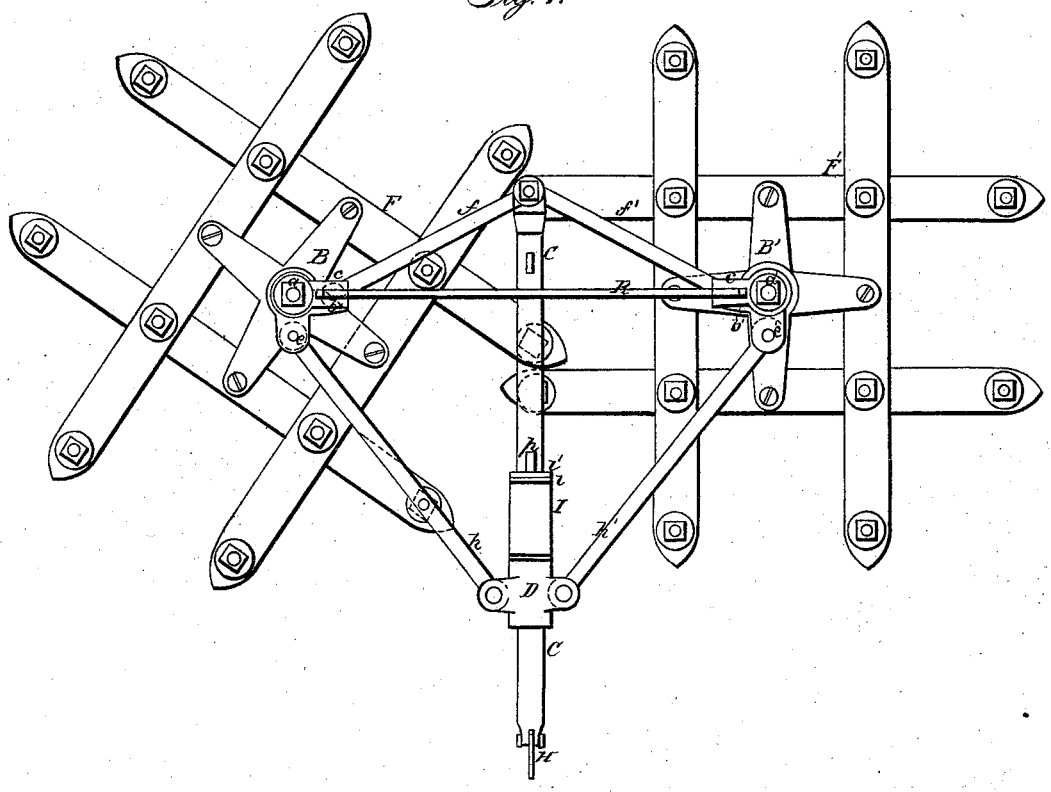
Figure 2:
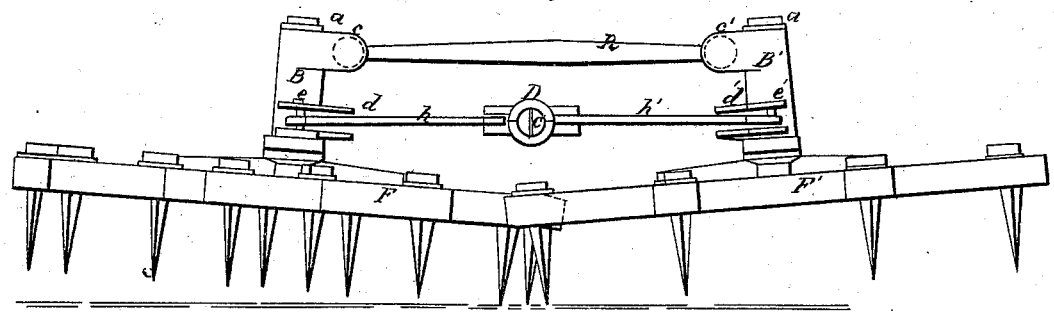

Figure 1 is a top view of the harrow. Fig. 2 is a front view of the harrow in operation.

The nature of my invention consists in rendering the harrow adjustable by the resistance to be overcome in the operation.

In the drawings, F F' are the harrow-frames, from the centers of which arise vertical standards over which pass the sleeves B B', a nut, $a$, at top securing the standard in the sleeve and permitting it to rotate therein. The sleeves B B' have lugs $c\ c'$, $d\ d'$, $e\ e'$, the first pair of which are invariably connected by a rod, R. From the lugs $d\ d'$ run the rods $f\ f'$ to the rear extremity of the draft-bar C, and from lugs $e\ e'$ run the oblique rods $h\ h'$, jointed to the loose sleeve D on the draft-bar C.

Behind the sleeve D is a rubber spring, I, and a series of washers, $i\ i'$, &c., the whole being kept in position by a pin, $p$, passing through the draft-bar C.

In operation the team is attached to the hook H. The resistance of the earth causes the draft-bar C to move forward, which produces a pressure of rods $f\ f'$ against the lower portions of the sleeves B B', tilting the harrows upward on their outer edges, as shown in Fig. 2, when, by reason of their construction, they will rotate about the standards because of the resistance to the inner teeth, which are sunk most deeply in the ground. The greater the resistance met with by the teeth the more rods $f\ f'$ will approximate to a straight line and the more the outer teeth will be elevated, causing them to take less hold on the earth, thus causing the harrow to adjust itself to the nature of the soil operated upon. The rubber spring I contracts during this operation, and when a less degree of resistance is met with the spring expands and the inclination of the frames is diminished.

The details of construction of this harrow may be varied in many ways, but the principle involved will remain the same. Therefore I do not wish to confine myself to the precise arrangement of parts shown in the drawings.

What I claim, and desire to secure by Letters Patent, is—

Giving the sleeves B B' an invariable connection at one extremity and a variable connection attached to the draft-bar at the other, substantially as and for the purpose set forth.

In testimony whereof I have hereunto signed my name before two subscribing witnesses.

W. T. HILDRUP.

Witnesses:
GEO. PATTEN,
JOHN S. HOLLINGSHEAD.